US008824902B2

(12) United States Patent
Sakamoto et al.

(10) Patent No.: US 8,824,902 B2
(45) Date of Patent: Sep. 2, 2014

(54) OPTICAL RECEIVER, METHOD FOR RECEIVING OPTICAL SIGNAL, AND OPTICAL TRANSMISSION SYSTEM

(75) Inventors: Takeshi Sakamoto, Kawasaki (JP); Kosuke Komaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 181 days.

(21) Appl. No.: 13/177,644

(22) Filed: Jul. 7, 2011

(65) Prior Publication Data
US 2012/0051754 A1 Mar. 1, 2012

(30) Foreign Application Priority Data

Aug. 30, 2010 (JP) ................................. 2010-192189

(51) Int. Cl.
H04B 10/06 (2006.01)
H04B 10/00 (2013.01)
H04B 17/00 (2006.01)
H04B 10/079 (2013.01)
H04B 10/032 (2013.01)
H04B 10/61 (2013.01)

(52) U.S. Cl.
CPC ........ *H04B 10/032* (2013.01); *H04B 10/07951* (2013.01); *H04B 10/07953* (2013.01); *H04B 10/616* (2013.01)
USPC ................. 398/202; 398/115; 398/9; 398/17; 398/22; 398/25

(58) Field of Classification Search
USPC ................. 398/24, 25, 27, 202, 115
See application file for complete search history.

(56) References Cited

U.S. PATENT DOCUMENTS

| 3,761,818 | A * | 9/1973 | Tazaki et al. .................. 375/293 |
| 7,088,173 | B1 * | 8/2006 | Rozario et al. .................... 330/2 |
| 7,315,511 | B2 | 1/2008 | Morita et al. |
| 8,532,503 | B2 | 9/2013 | Nakashima et al. |
| 2002/0051271 | A1 | 5/2002 | Yoshikoshi .................. 359/189 |
| 2003/0076857 | A1 | 4/2003 | Morita et al. |
| 2004/0213338 | A1 * | 10/2004 | Strawczynski et al. ....... 375/224 |
| 2005/0158047 | A1 * | 7/2005 | Way et al. ...................... 398/59 |
| 2007/0089015 | A1 * | 4/2007 | Saul ............................ 714/746 |
| 2009/0214201 | A1 | 8/2009 | Oda et al. |
| 2009/0238556 | A1 * | 9/2009 | Yamada et al. ................... 398/5 |
| 2010/0098411 | A1 | 4/2010 | Nakashima et al. |

FOREIGN PATENT DOCUMENTS

| JP | 2003-134074 | 5/2003 |
| JP | 2009-198364 | 9/2009 |
| JP | 2010-98617 | 4/2010 |

OTHER PUBLICATIONS

Office Action mailed Jan. 14, 2014 in corresponding Japanese Application No. 2010-192189.

* cited by examiner

*Primary Examiner* — Oommen Jacob
(74) *Attorney, Agent, or Firm* — Staas & Halsey LLP (57) ABSTRACT

An optical receiver includes: an optical to electric converter that converts a received optical signal into an analog electric signal; an analog to digital converter that converts the analog electric signal obtained by the optical to electric converter into a digital signal; a digital signal processor that performs wave shaping on the digital signal; an information extract circuit that extracts information related to loss or deterioration of the optical signal from a signal propagating from the analog to digital converter to the digital signal processor or a signal in the digital signal processor; and a judging circuit that judges, based on the information extracted by the information extract circuit, whether the optical signal is lost or deteriorates.

13 Claims, 9 Drawing Sheets

WHILE SIGNAL IS INPUT

FIG. 3B

WHILE SIGNAL IS LOST

SIGNAL PROPAGATING
STATE (NORMAL)

LOS STATE

OPTICAL RECEIVER, METHOD FOR RECEIVING OPTICAL SIGNAL, AND OPTICAL TRANSMISSION SYSTEM

CROSS-REFERENCE TO RELATED APPLICATION

This application is based upon and claims the benefit of priority of the prior Japanese Application No. 2010-192189 filed on Aug. 30, 2010 in Japan, the entire contents of which are hereby incorporated by reference.

FIELD

The embodiment discussed herein is related to an optical receiver, a method for receiving an optical signal, and an optical transmission system.

BACKGROUND

In an optical transmission system, it is desired to rapidly deal with failure on a transmission path and a failure in a device therein. Patent Literature 1 discloses a technique of dealing with failure on a transmission path or a failure in a device in an optical transmission system.

In an optical transmission system, an LOS (Loss Of Signal) signal may be used as not only for an alarm about a state of a network but also a trigger that switches the transmission path to a redundant path. In this case, a photo detector or FEC (Forward Error Correction) processor disposed in the receiver may monitor loss or deterioration of an optical signal.

Patent Literature 1: Japanese Laid-open Patent Publication No. 2003-134074

In an optical transmission system, detection of an LOS signal in a short time is very important. An LOS state is detected unless an optical signal reaches the receiver in the event of occurrence of a problem with the optical signal at an optical transmitter or the transmission path. However, an input level of an optical signal may not decline due to superimposing an ASE (Amplified Spontaneous Emission) light onto the optical signal in the transmission path.

In this case, it may be difficult to detect an LOS state. This means that it takes time to detect an LOS state, which may interfere with a route switching in a predetermined time period. In particular, the number of transmission spans has increased in accordance with recent improvement in the performance of the receiver, and consequently, the ASE light power in an LOS state is large. For the above, it is difficult to detect an LOS state through the use of light power.

Alternatively, an LOS state may be detected through the use of a BER (Bit Error Rate) or the number of error detections by FEC (Forward Error Corrections). However, detection based on a BER or the number of error detections by FEC takes time, so that these pieces of information are not suitable for signals for switching the route.

SUMMARY (1) According to an aspect of the embodiment, an apparatus includes an optical receiver including: an optical to electric converter that converts a received optical signal into an analog electric signal; an analog to digital converter that converts the analog electric signal obtained by the optical to electric converter into a digital signal; a digital signal processor that performs wave shaping on the digital signal; an information extract circuit that extracts information related to loss or deterioration of the optical signal from a signal propagating from the analog to digital converter to the digital signal processor or a signal in the digital signal processor; and a judging circuit that judges, based on the information extracted by the information extract circuit, whether the optical signal is lost or deteriorates.

(2) According to an aspect of the embodiment, a system includes an optical transmission system including: an optical transmitter that transmits an optical signal; a transmission path for the optical signal transmitted by the optical transmitter; and the above optical receiver.

(3) According to an aspect of the embodiment, a method includes a method for receiving an optical signal in an optical receiver including an optical to electric converter that converts a received optical signal into an analog electric signal, an analog to digital converter that converts the analog electric signal obtained by the optical to electric converter into a digital signal, and a digital signal processor that performs wave shaping on the digital signal, the method including: extracting information related to loss or deterioration of the optical signal from a signal propagating from the analog to digital converter to the digital signal processor or a signal in the digital signal processor; and judging, based on the information extracted by the extracting, whether the optical signal is lost or deteriorates.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Hereinafter, an embodiment will now be described with reference to the accompanying drawings.

First Embodiment

Figure 1:
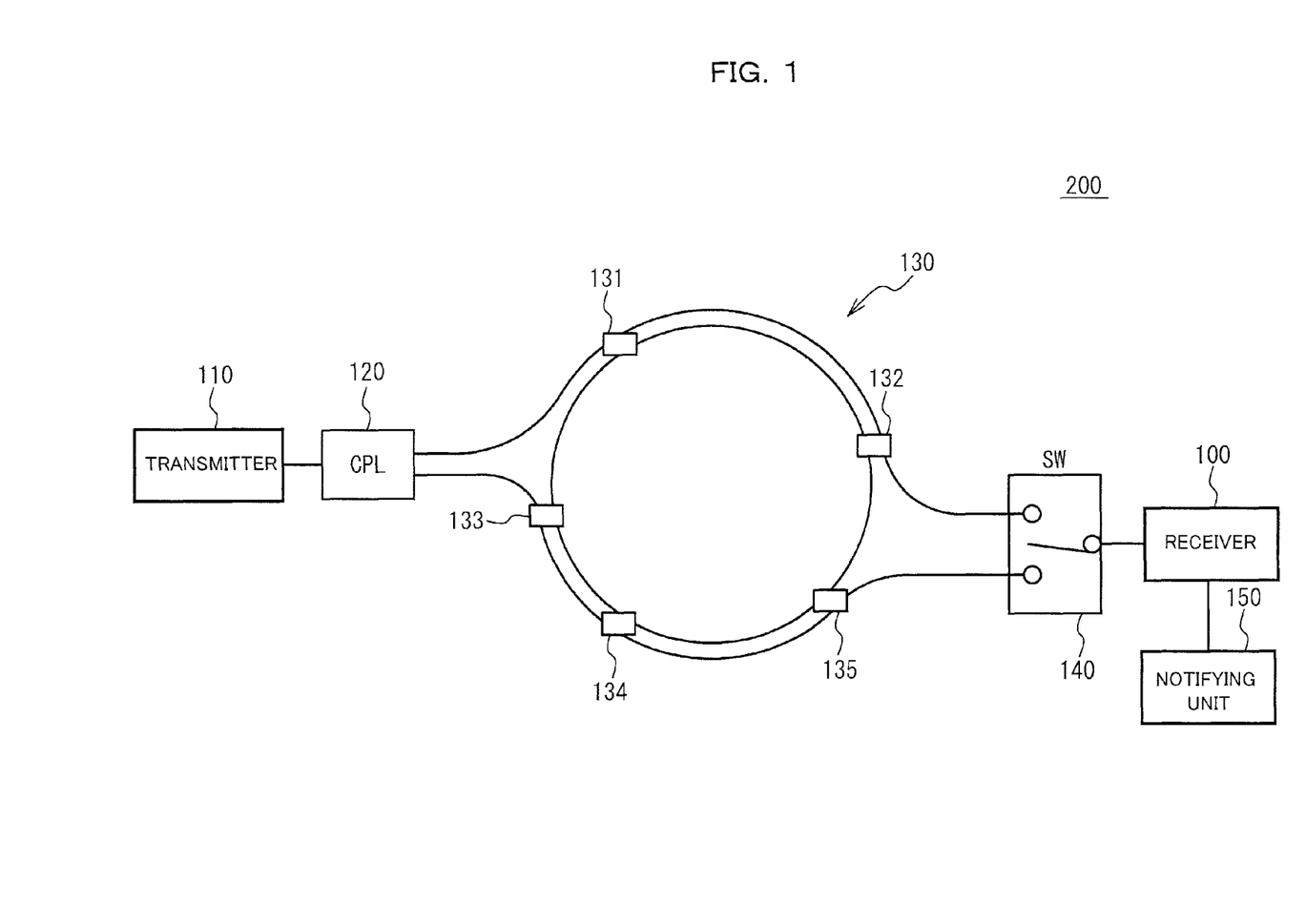
FIG. 1 is a block diagram illustrating the entire configuration of an optical transmission system including an optical receiver according to the first embodiment.

FIG. 1 is a block diagram illustrating the entire configuration of an optical transmission system 200 including an optical receiver 100 of the first embodiment. Referring to FIG. 1, the optical transmission system 200 includes an optical transmitter 110, an optical coupler 120, a transmission path 130, an optical switch 140, a notifying unit 150, and an optical receiver 100. The transmission path 130 includes a number of spans connected to each other via a number of nodes 131-135.

The optical transmitter 110 converts an electric signal to an optical signal and transmits the converted optical signal to the optical coupler 120. The optical coupler 120 divides the optical signal received from the optical transmitter 110 into two optical signals, and outputs the two divided optical signals. The two divided optical signals propagate through some of the nodes and reach the optical switch 140. For example, one of the divided optical signals reaches the optical switch 140 through the nodes 131 and 132; and the other signal reaches the optical switch 140 through the nodes 133, 134, and 135. Namely, the optical transmission system 200 includes a first route passing through the nodes 131 and 132, and a second route passing through the nodes 133, 134, and 135.

The optical switch 140 transmits one of the two divided optical signals received therein to the optical receiver 100. Accordingly, the optical switch 140 serves as a switching unit that switches between the first route and the second route. In the cases where an optical signal is lost or deteriorates on the transmission path 130, the optical switch 140 switches the route between the first route and the second route. The notifying unit 150 notifies a user that an optical signal is lost or deteriorates. For example, the notifying unit 150 is realized by a displaying device such as a monitor display.

Figure 2:
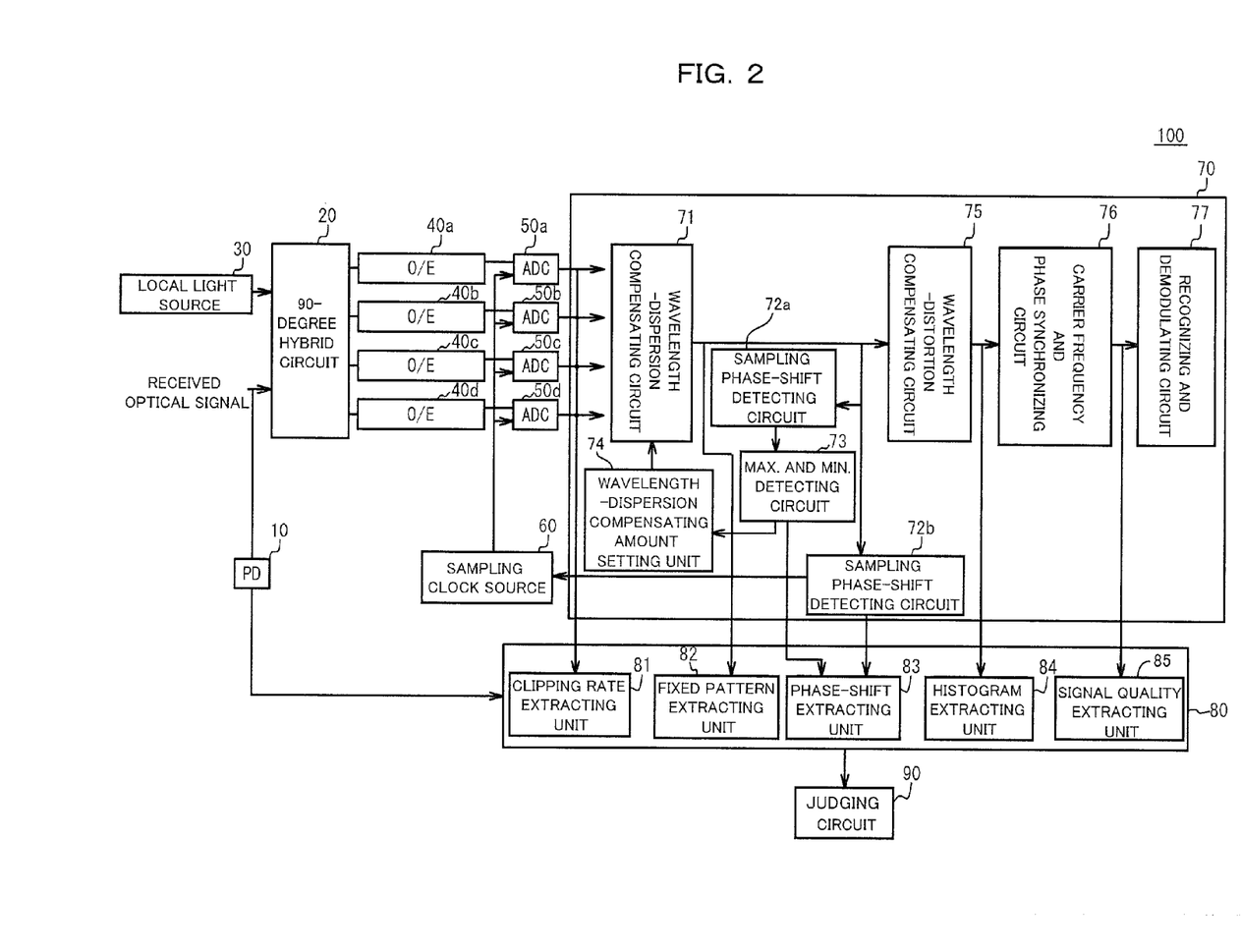
FIG. 2 is a block diagram illustrating the entire configuration of an optical receiver.

FIG. 2 is a block diagram illustrating the entire configuration of the optical receiver 100. Referring to FIG. 2, the optical receiver 100 includes a photo detector (PD) 10, a 90-degree hybrid circuit 20, a local light source 30, optical to electric (O/E) conversion circuits 40a through 40d, analog to digital (A/D) conversion circuits 50a through 50d, a sampling clock source 60, a digital signal processor 70, an information extract circuit 80, and a judging circuit 90.

The digital signal processor 70 includes a wavelength-dispersion compensating circuit 71, sampling phase-shift detecting circuits 72a and 72b, a maximum (max.) and minimum (min.) detecting circuit 73, a wavelength-dispersion compensating amount setting unit 74, a wavelength-distortion compensating circuit 75, a carrier frequency and phase synchronizing circuit 76, and a recognizing and demodulating circuit 77. The information extract circuit 80 includes a clipping rate extracting unit 81, a fixed pattern extracting unit 82, a phase-shift extracting unit 83, a histogram extracting unit 84, and a signal quality extracting unit 85.

A received optical signal input into the optical receiver 100 and a local oscillation optical signal output from the local light source 30 are input into the 90-degree hybrid circuit 20. The 90-degree hybrid circuit 20 combines the received optical signal and the local oscillation optical signal in units of each of two orthogonal components, and outputs optical signals of the real part (I components) and the imaginary part (Q components) of polarization components (H polarization and V polarization). In this embodiment, a received optical signal is divided into four signals, but the number of division is not particularly limited.

The O/E circuits 40a-40d each perform optical to electric (O/E) conversion on one of the signals lights of the I component and the Q component of the two orthogonal polarizations. In the first embodiment, the O/E circuit 40a performs O/E conversion on the HI component optical signal; the O/E circuit 40b performs O/E conversion on the HQ component optical signal; the O/E circuit 40c performs O/E conversion on the VI component optical signal; and the O/E circuit 40d performs O/E conversion on the VQ component optical signal.

The A/D circuits 50a-50d convert electric signals output from the O/E circuits 40a-40d, respectively, into digital signals in synchronization with the timing of signal inputting from the sampling clock source 60 (i.e., at sampling frequency). The A/D circuits 50a-50d input the digital signals obtained through the conversion into the digital processor 70.

The digital signals input into the digital processor 70 is firstly input into the wavelength-dispersion compensating circuit 71, which compensates for wavelength dispersion of each input digital signal, and then inputs the compensated digital signals into the wavelength-distortion compensating circuit 75. The wavelength-distortion compensating circuit 75 carries out adaptive equalizing processing to compensate for wavelength distortion of the digital signal after being subjected to the wavelength-dispersion compensation, and inputs the compensated signal into the carrier frequency and phase synchronizing circuit 76. The carrier frequency and phase synchronizing circuit 76 synchronizes the carrier frequency with the phase of the received optical signal received in the optical receiver 100. The recognizing and demodulating circuit 77 demodulates the digital signal output from the carrier frequency and phase synchronizing circuit 76 through data recognition.

The digital signal subjected to wavelength compensation in the wavelength-dispersion compensating circuit 71 is also input into the sampling phase-shift detecting circuits 72a and 72b. The sampling phase-shift detecting circuits 72a and 72b detect a phase shift (phase error) of the modulated frequency of the received optical signal that the optical receiver 100 receives from the sampling frequency through the use of the digital signals output from the wavelength-dispersion compensating circuit 71. The sampling phase-shift detecting circuit 72b inputs the detected amount of phase shift into the sampling clock source 60, which responsively adjust the sampling clock such that the amount of phase shift is cancelled.

The sampling phase-shift detecting circuit 72a input the detected amount of phase shift into the max. and min. detecting circuit 73, which detects the minimum sensitivity and the maximum sensitivity to detect a phase shift. The wavelength-dispersion compensating amount setting unit 74 detects an amount of wavelength dispersion from error of compensating for wavelength dispersion corresponding to the minimum sensitivity or the maximum sensitivity, and sets the detected amount to be the amount of compensating for wavelength dispersion in the wavelength-dispersion compensating circuit 71.

The information extract circuit 80 extracts information related to loss or deterioration of an optical signal from a signal propagating from the A/D circuits 50a-50d to the digital signal processor 70 or a signal in the digital signal processor 70. The judging circuit 90 judges, on the basis of information extracted by the information extract circuit 80, whether or not the optical signal is lost or deteriorates. Hereinafter, description will now be made in relation to the details of the information extract circuit 80 and the judging circuit 90.

(Amplitude of a Digital Signal)

Figure 3A:
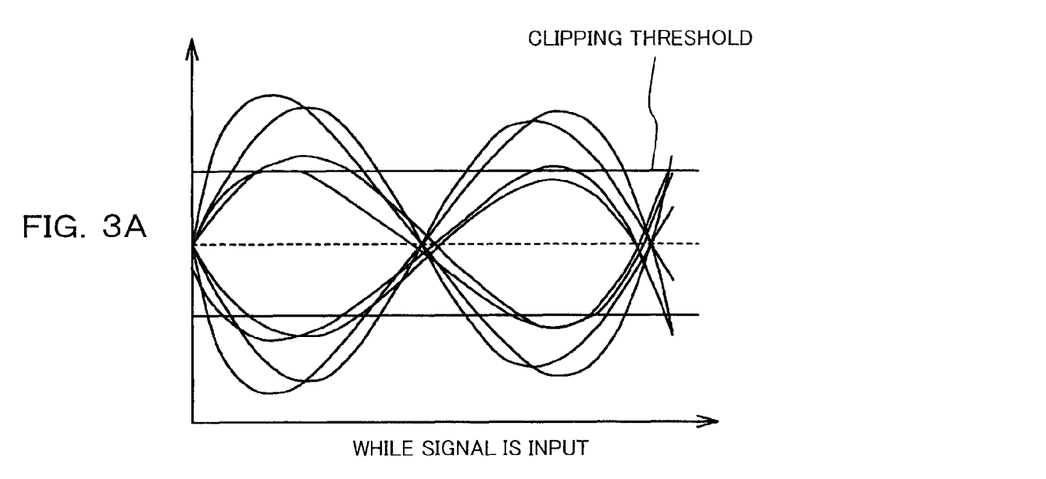
FIGS. 3A and 3B are diagrams illustrating a relationship between amplitude of a digital signal and a clipping threshold.
Figure 3B:
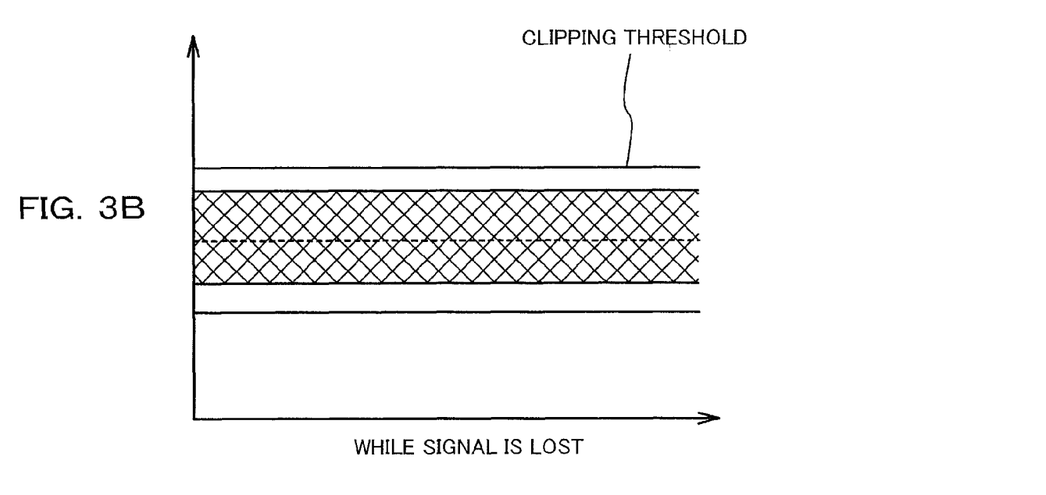

The clipping rate extracting unit 81 carries out clipping if the amplitude of a digital signal input into the digital signal processor 70 exceeds a clipping threshold. FIGS. 3A and 3B are diagrams illustrating relationship between amplitude of the digital signal and the clipping threshold. In FIGS. 3A and 3B, the abscissa represents time, and the ordinate represents level of a digital signal. Referring to FIG. 3A, if the optical receiver 100 receives a normal optical signal, the amplitude of the digital signal exceeds the clipping threshold. In contrast, as illustrated in FIG. 3B, while signal is lost or deteriorates, the amplitude of a digital signal is lower than the clipping threshold.

The clipping rate can be defined as the number of times of clipping per unit time, that is, the number of times the amplitude of the digital signal exceeds the clipping threshold per unit time. The clipping rate extracting unit 81 extracts the clipping rate and inputs the clipping rate into the judging circuit 90. When the optical signal is lost or deteriorates as illustrated in FIG. 3B, the clipping rate comes close to zero. The judging circuit 90 monitors the clipping rate that the clipping rate extracting unit 81 extracts. If the clipping rate is lower than a threshold for judging, the judging circuit 90 judges that an optical signal is lost or deteriorates, the threshold for judging may be a value close to zero.

Error in detection may make it impossible to judge whether or not the optical signal is lost or deteriorates. This may be solved by setting two thresholds: a first threshold for judging deterioration of the optical signal; and a second threshold for judging loss of the optical signal (where, the first threshold>the second threshold). These thresholds for judging can be previously obtained on the basis of the relationship between the clipping rate and a BER. Alternatively, these thresholds may be obtained on the basis of relationship between the clipping rate and the BER through lowering a level of a fixed pattern or lowering the receiving power level at the optical transmitter 110 when the optical transmission system 200 is started.

The digital signals input from A/D circuits 50a-50d into the wavelength dispersion-compensating circuit 71 do not undergo wave shaping, which may result in large error in detecting the amplitudes of the digital signals. However, since digital signals before being subjected to phase sampling synchronization processing, judgment can be make whether or not an optical signal is lost or deteriorates even if the phase shifts. Accordingly, a judgment whether or not the optical signal is lost or deteriorates may be made on the basis of the amplitude of a signal when the phase shifts.

(Fixed Pattern)

Figure 4:
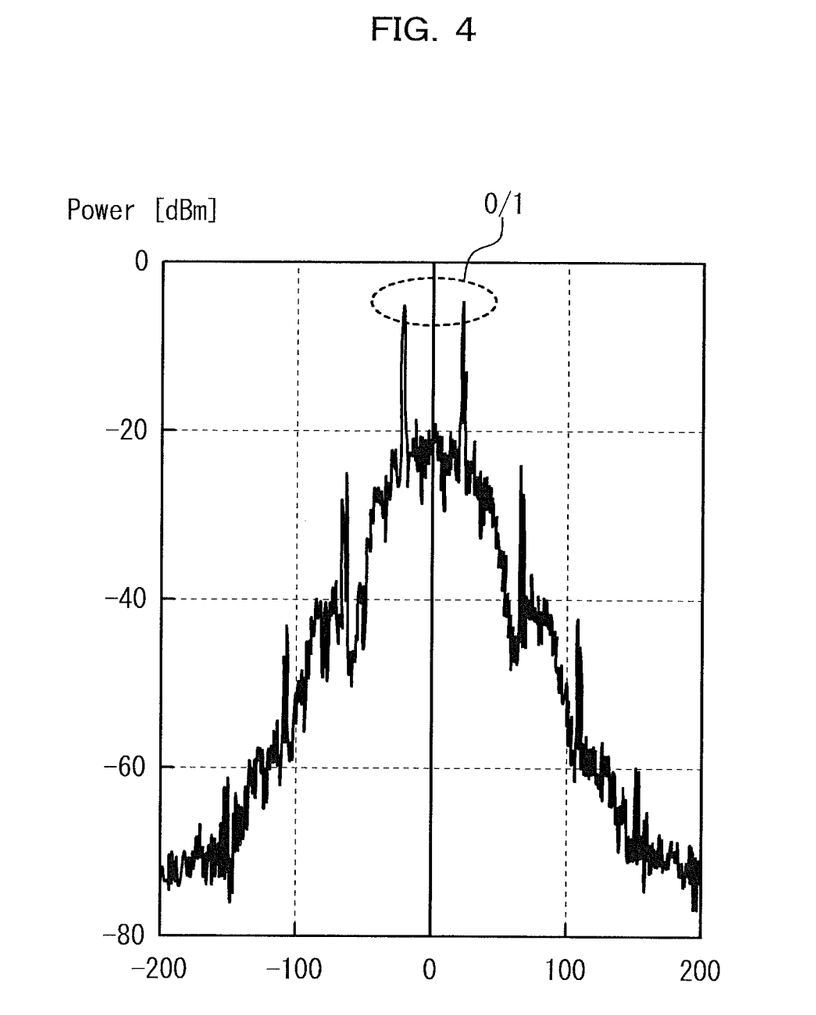
FIG. 4 is a graph illustrating an example of light spectrum obtained by Fourier transformation.

The fixed pattern extracting unit 82 extracts a fixed pattern that the optical transmitter 110 transmits with the intention of frame synchronization, and inputs the extracted fixed pattern into the judging circuit 90. The fixed pattern extracting unit 82 extracts a fixed pattern from a digital signal propagating from the wavelength-dispersion compensating circuit 71 to the wavelength-distortion compensating circuit 75. For example, the fixed pattern extracting unit 82 obtains a light spectrum through Fourier transformation on the fixed pattern. FIG. 4 illustrates an example of a light spectrum obtained by Fourier transformation. In FIG. 4 the abscissa represents a frequency, and the ordinate represents a light power (dBm). In FIG. 4, the abscissa indicates a decrease and an increase on the basis of a predetermined reference frequency.

For example, assuming that the optical transmitter 110 transmits an alternating pattern 0/1, peaks appear at particular frequencies on the spectrum as illustrated in FIG. 4. In the event of loss or deterioration of an optical signal, the peak values on the spectrum lower. Accordingly, the threshold for judging loss or deterioration of the optical signal can be set by previously obtained the relationship between the peak value of the spectrum and a BER. The judging circuit 90 monitors the peak values of the spectrum, and judges that the optical signal is lost or deteriorates when the peak values on the spectrum become lower than the threshold for judging.

Extraction of a fixed pattern is peculiar to digital coherent signal processing and is capable of judging loss or deterioration of the optical signal more quickly (several dozens μs through 100 μm) than a conventional judgment using a BER. The protection time for the extraction may be set to be several dozens μs through 100 μs. Here, the protection time represents a time period for which a judgment whether an optical signal is not made. Setting such a protection time makes it possible to avoid misjudgment.

Error in detection may make it impossible to judge whether or not the optical signal is lost or deteriorates. This may be solved by setting two thresholds: a first threshold for judging deterioration of the optical signal; and a second threshold for judging loss of the optical signal (where, the first threshold>the second threshold). These thresholds for judging can be previously obtained on the basis of the relationship between the peak value and a BER. Alternatively, these thresholds may be obtained on the basis of relationship between the peak value and a BER through lowering a level of a fixed pattern or lowering the receiving power level at the optical transmitter 110 when the optical transmission system 200 is started.

The above judgment using a fixed pattern does not confirm the fixed pattern by 1/0 judgment on the signal, but does detect peaks of the fixed pattern from the spectrum of the signal. Accordingly, the detection is carried out at a high speed. Here, if noise is superimposed onto the spectrum as a result of deterioration of an optical signal, there is a possibility that the peaks of a fixed pattern are not detected. However, since digital signals before being subjected to phase sampling synchronization processing, judgment can be make whether or not an optical signal is lost or deteriorates even if the phase shifts. Accordingly, a judgment whether or not the optical signal is lost or deteriorates may be made on the basis of the amplitude of a signal when the phase shifts.

(Sensitivity of Detecting Sampling Phase Shift)

Figure 5:
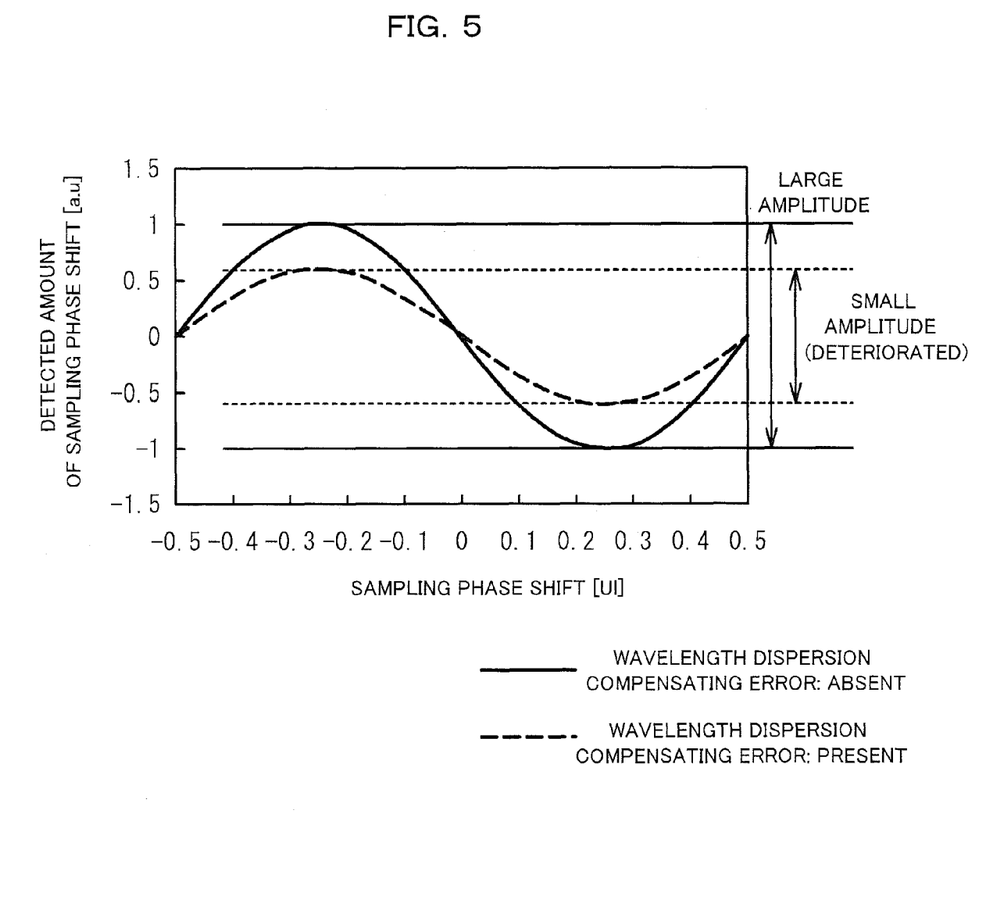
FIG. 5 is a graph illustrating a detected value of sampling phase shift.

The phase-shift extracting unit 83 extracts values that the max. and min. detecting circuit 73 extracts and input the extracted values into the judging circuit 90. FIG. 5 illustrates detected values (amounts) of sampling phase shift. In FIG. 5, the abscissa represents a sampling phase shift, and the ordinate represents a detected value of sampling phase shift. When an optical signal is lost or deteriorates and the signal quality deteriorates due to excessive wavelength dispersion, the detected value has small amplitude as the dotted line of FIG. 5 illustrates. Accordingly, a threshold for judging loss or deterioration of an optical signal can be set by previously obtained the relationship between the amplitude and the BER. The judging circuit 90 monitors the amplitude of a detected value, and judges that an optical signal is lost or deteriorates when the amplitude come to be lower than the threshold for judging.

Extraction of a detected value of sampling phase shift is peculiar to digital coherent signal processing and is capable of judging loss or deterioration of an optical signal more quickly (several dozens μs through 100 μm) than a conventional judgment using a BER. A time period of several dozens μs through 100 μs may be allowed for the protection time for the extraction.

Error in detection may make it impossible to judge whether or not the optical signal is lost or deteriorates. This may be solved by setting two thresholds: a first threshold for judging deterioration of an optical signal; and a second threshold for judging loss of the optical signal (where, the first threshold>the second threshold). These thresholds for judging can be previously obtained on the basis of the relationship between the amplitude and a BER. Alternatively, these thresholds may be obtained on the basis of relationship between the amplitude and the BER through lowering a level of a fixed pattern or lowering the receiving power level at the optical transmitter 110 when the optical transmission system 200 is started.

(Sampling Phase Shift)

The phase-shift extracting unit 83 extracts a sampling phase shift from the sampling phase-shift detecting circuit 72a, and inputs the extracted sampling phase shift into the judging circuit 90. A sampling phase shift increases in the event of loss or deterioration of an optical signal. Accordingly, the threshold for judging loss or deterioration of an optical signal can be set by previously obtained the relationship between the sampling phase shift and the BER. The judging circuit 90 monitors the sampling phase shift, and judges that an optical signal is lost or deteriorates when the sampling phase shift exceeds the threshold for judging.

It takes several ms to detect phase synchronization shift, such as unlocking of Clock Data Recover (CDR). In contrast, use of a sampling phase shift allows detection in units of a single phase, that is detection only for about several dozens μs through 100 μs. A time period of several dozens μs through 100 μs may be allowed for the protection time for the extraction.

(Histogram)

Figure 6A:
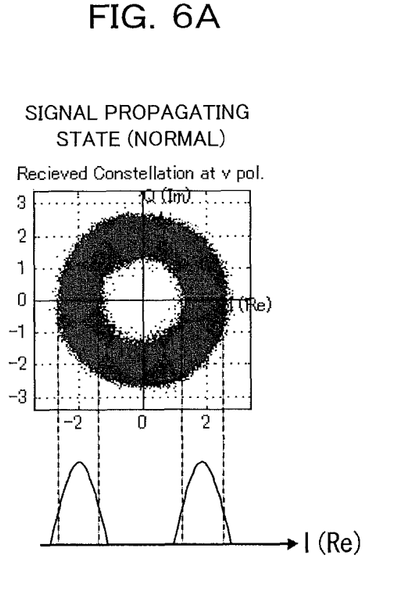
FIGS. 6A and 6B are diagrams illustrating histograms under a signal propagating state (normal) and a Loss-of-signal (LOS) state.
Figure 6B:
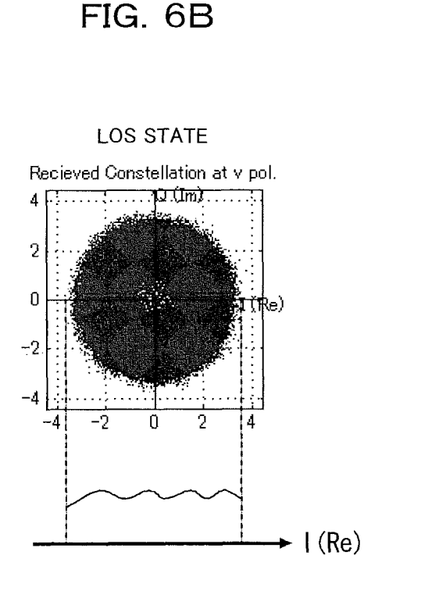

The histogram extracting unit 84 extracts a histogram of a constellation after compensation for wavelength distortion, and inputs the extracted histogram into the judging circuit 90. Specifically, the histogram extracting unit 84 extracts histograms from a digital signal propagating from the wavelength-distortion compensating circuit 75 to the carrier frequency and phase synchronizing circuit 76. FIG. 6A illustrates a histogram under a signal propagating state, and FIG. 6B illustrates a histogram under the LOS state. In FIGS. 6A and 6B, the abscissa represents a real part, and the ordinate represents an imaginary part. Thereby, FIGS. 6A and 6B illustrate phases.

Referring to FIG. 6A, the histogram under a signal propagating state has peaks. In contrast, referring to FIG. 6B, the histogram under the LOS state has no peak. Accordingly, the threshold for judging loss or deterioration of the optical signal can be set by previously obtained the relationship between the peak value of a histogram and the BER. The judging circuit 90 monitors the peak of a histogram, and judges that an optical signal is lost or deteriorates when the sampling phase shift exceeds the threshold for judging.

Comparing with judging a BER on the basis of the number of FEC corrections, extraction of the peak of a histogram can judge loss or deterioration of the optical signal for a short time period of several dozens μs though 100 μs. A time period of several dozens μs through 100 μs may be allowed for the protection time for the extraction.

Error in detection may make it impossible to judge whether or not the optical signal is lost or deteriorates. This may be solved by setting two thresholds: a first threshold for judging deterioration of the optical signal; and a second threshold for judging loss of the optical signal (where, the first threshold>the second threshold). These thresholds for judging can be previously obtained on the basis of the relationship between the peak value of a histogram and a BER. Alternatively, these thresholds may be obtained on the basis of relationship between the peak value of a histogram and the BER through lowering a level of a fixed pattern or lowering the receiving power level at the optical transmitter 110 when the optical transmission system 200 is started.

A histogram is extracted after waveform distortion is compensated, which means higher accuracy than upstream extracting points. However, a histogram can be extracted when processing at the upstream has no problem. Extracting a histogram in conjunction with the results of the extractions at the upstream points makes it possible to further accurately judge whether or not the optical signal is lost or deteriorates.

In the above example, the judging circuit 90 monitors the peak value of a histogram, which is not however limited to. Alternatively, the judging circuit 90 may monitor the width of the peak of the histogram. In this case, in the event of loss or deterioration of the optical signal, the peak width becomes too board to detect a peak as illustrated in FIG. 6B. Accordingly, if a peak width of a histogram exceeds a predetermined value, the optical signal may be judged to be lost or deteriorate.

(Signal Quality)

Figure 7:
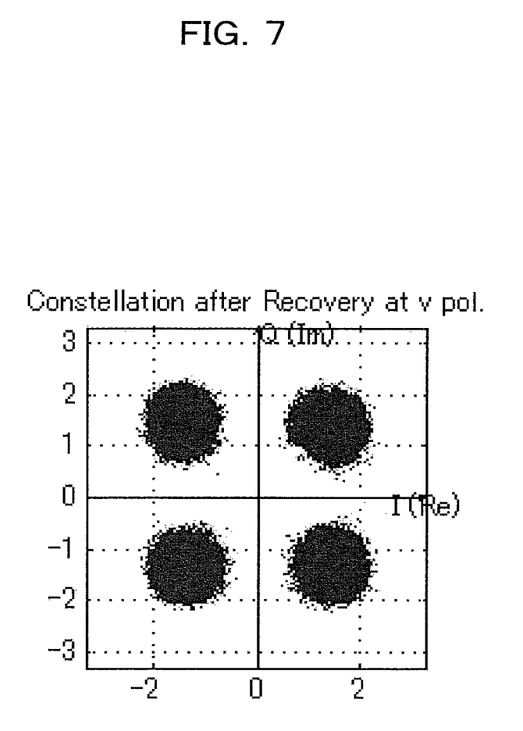
FIG. 7 is diagram illustrating constellations distributed to the respective quadrants.

The signal quality extracting unit 85 extracts signal qualities (Q values) of constellation distributed to the respective quadrants. The constellation distributed to the respective quadrants can be extracted from a digital signal propagating from the carrier frequency and phase synchronizing circuit 76 to the recognizing and demodulating circuit 77. FIG. 7 illustrates constellation distributed to the respective quadrants. In FIG. 7, the abscissa represents a real part, and the ordinate represent an imaginary part. Thereby, FIG. 7 illustrates a phase.

In the event of loss or deterioration of the optical signal, the signal quality (Q value) lowers. Accordingly, a threshold of judging whether the optical signal is lost or deteriorates can be set by obtaining the relationship between a signal quality (Q value) and a BER in advance. The judging circuit 90 monitors the signal quality (Q value), and if the signal quality becomes lower than the threshold for judging, judges that a signal is lost or deteriorates.

Comparing with judging a BER on the basis of the number of FEC corrections, extraction of a signal quality (Q value) can judge loss or deterioration of an optical signal for a short time period of several dozens μs though 100 μs. A time period of several dozens μs through 100 μs may be allowed for the protection time for the extraction.

Error in detection may make it impossible to judge whether or not the optical signal is lost or deteriorates. This may be solved by setting two thresholds: a first threshold for judging deterioration of the optical signal; and a second threshold for judging less of the optical signal (where, the first threshold>the second threshold). These thresholds for judging can be previously obtained on the basis of the relationship between the signal quality (Q value) and a BER. Alternatively, these thresholds may be obtained on the basis of relationship between the signal quality (Q value) and the BER through lowering a level of a fixed pattern or lowering the receiving power level at the optical transmitter 110 when the optical transmission system 200 is started.

A signal quality (Q value) is extracted after waveform distortion is compensated, which means higher accuracy than upstream extracting points. However, a signal quality (Q value) can be extracted when processing at the upstream has no problem. Extracting a signal quality (Q value) in conjunction with the results of the extractions at the upstream points makes it possible to further accurately judge whether or not an optical signal is lost or deteriorates.

As described above, it is possible to shorten time to detect loss or deterioration of an optical signal through the use of information extracted from signals propagating from the A/D circuits to the digital signal processor or signals in the digital signal processor.

(Light Power of a Received Optical Signal)

The judging circuit 90 may judge loss or deterioration of an optical signal on the basis of the result of detection by the PD 10 in addition to the above extracted information. In the event of loss or deterioration of a signal light, the light power of an optical signal that the PD 10 receives lowers. Therefore, the judging circuit 90 may judge that an optical signal is lost or deteriorates if the light power of an optical signal that the PD 10 receives becomes lower than a predetermined value.

However, when an ASE light power superimposed onto an optical signal is large, it is difficult to judge whether the light power of an optical signal lowers or the ASE light power is large. Accordingly, the judging circuit 90 may make the judgment based not only on the result of detection by the PD 10 but also on the above extracted information. The light power of a received signal light sometimes instantaneously varies, and therefore a time period of several dozens μs through 100 μs may be allowed for the protection time for the extraction.

Figure 8:
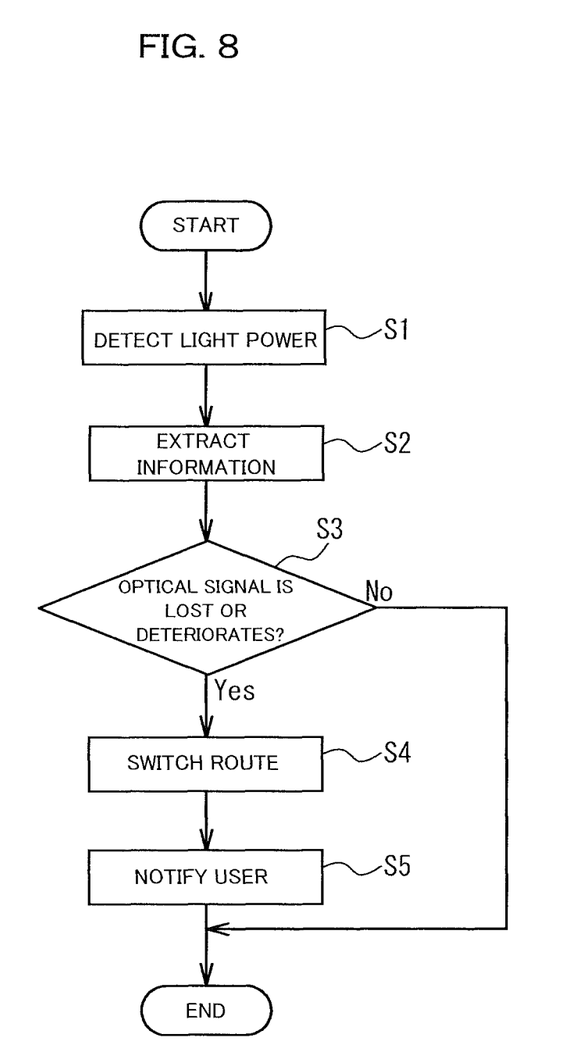
FIG. 8 is a flow diagram illustrating an example of a succession of procedural steps of judgment made on the basis of extracted information.

FIG. 8 is a flow diagram illustrating a succession of procedural steps of judging made through the use of the above extracted information. Referring to FIG. 8, the PD 10 detects the light power of an optical signal that the optical receiver 100 receives (step S1). Next, the information extract circuit 80 extracts information related to loss or deterioration of a signal light (step S2). Then the judging circuit 90 judges, on the basis of the light power detected in step S1 and the information extracted in step S2, whether an optical signal is lost or deteriorates (step S3).

If the result of the judgment in step S3 is positive (YES route), the optical switch 140 switches the route (step S4). In succession, the notifying unit 150 notifies the user that the optical signal is lost or deteriorates (step S5) and the procedure is terminated. In the meantime, if the result of the judgment in step S3 is negative (No route), the procedure is also terminated.

Figure 9:
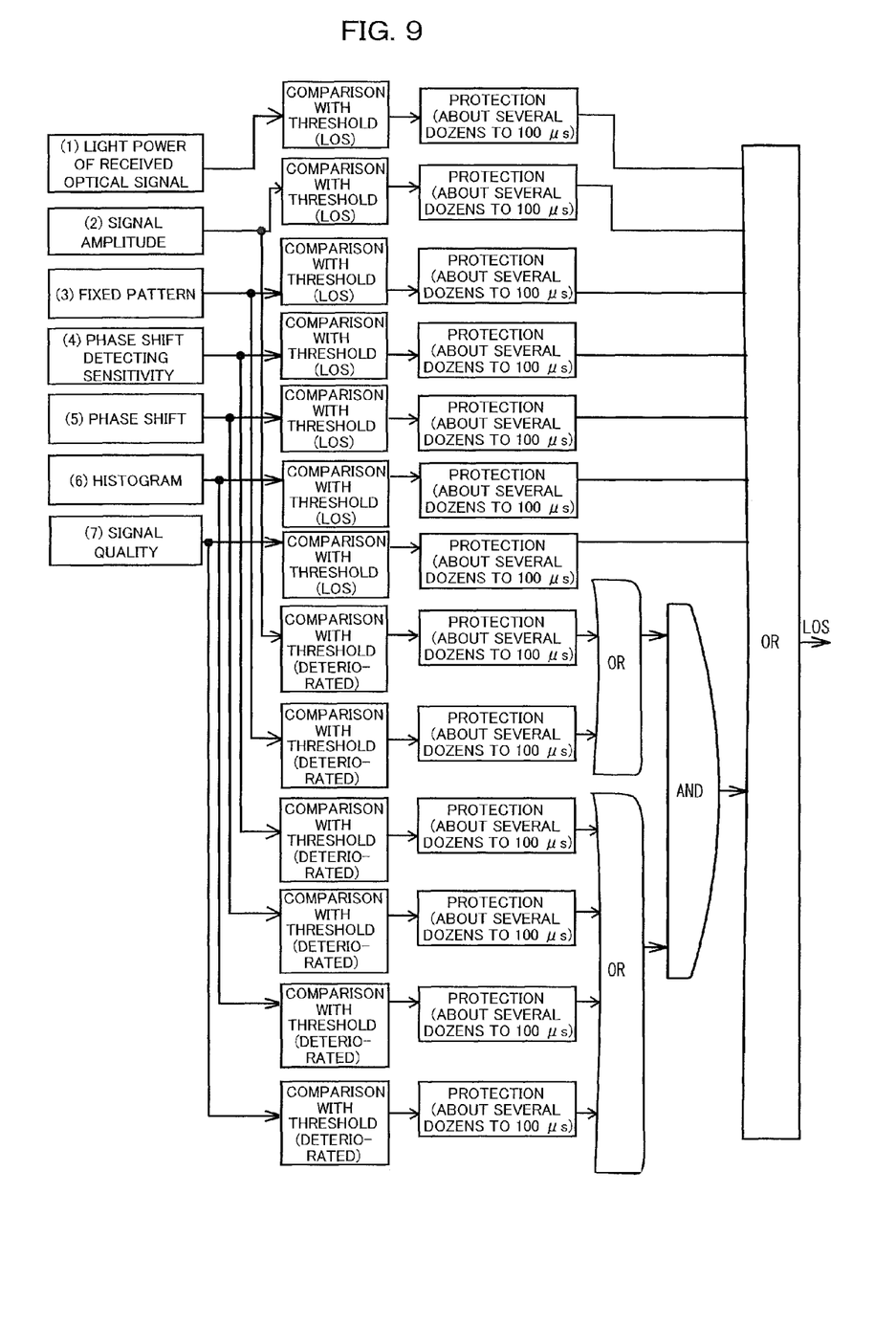
FIG. 9 is a diagram illustrating examples of combinations of pieces of extracted information pieces used for judging whether an optical signal is lost or deteriorates.

FIG. 9 illustrates examples of combinations of pieces of the extracted information used for judging whether an optical signal is lost or deteriorates. If a single extracted information piece is capable of solely judging whether an optical signal is lost, the single information piece judges that the optical signal is lost after a fixed protection time. Each pieces of the extracted information may set a threshold for judging loss of an optical signal and another threshold for judging deterioration of an optical signal.

A combination of an extracted information piece easily susceptible to noise and an extracted information piece hardly susceptible to noise can overall judges whether or not an optical signal is lost by a factor which has a difficulty in judgment due to error and accuracy problems. In the examples of FIG. 9, when it is difficult to make a judgment based on the downstream points (4) through (7), which tends to accurately judge loss or deterioration, the judgment is based on the "AND" combination of the OR condition of "deterioration" judgment in the points (4) through (7) and the OR condition of "deterioration" judgment in the points (2) and (3).

If loss of an optical signal is judged by the threshold for judging loss of an optical signal, the lost optical signal may be restored on the basis of judgment simply based on a hysteresis threshold for restoring. In contrast, if lost of an optical signal is judged by AND of a number of "deterioration" factors, the lost optical signal may be restored by judgment based on hysteresis thresholds for restoring from "deterioration". Specifically, if at least one of the factors exceeds the threshold for restoring, the loss of the optical signal is cancelled. Even if a light power of an optical signal does not judge loss of the optical signal, the above conditions make it possible to judge whether an optical signal is lost or deteriorates, which can reduce the time for detecting lost or deterioration of an optical signal. The combinations of extracted information pieces are not limited to those of FIG. 9, and various changed or modified combination can be used.

An embodiment of the present invention is described as the above, but the present invention should by no means limited to the foregoing embodiments. Various changes and modifications can be suggested without departing from the scope of the present invention. For example, the digital processor may include the information extract circuit 80 and/or the judging circuit 90.

According to the above optical receiver and a method of receiving an optical signal, it is possible to reduce the time for detection of loss or deterioration of a signal.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments have been described in detail, it should be understood that the various changes, substitutions, and alterations could be made hereto without departing from the spirit and scope of the invention.

What is claimed is:

1. An optical receiver comprising:
  an optical to electric converter that converts a received optical signal into an analog electric signal;
  an analog to digital converter that converts the analog electric signal obtained by the optical to electric converter into a digital signal;
  a digital signal processor that performs wave shaping on the digital signal to produce a shaped signal;
  an information extract circuit that extracts information related to loss or deterioration of the optical signal from a signal propagating from the analog to digital converter to the digital signal processor or a signal in the digital signal processor; and
  a judging circuit that judges, based on the information extracted by the information extract circuit, whether the optical signal is lost or deteriorated by comparing the information with a threshold, the information including at least one of:
    a number of times that an amplitude of the digital signal exceeds a threshold within a predetermined period,
    a light spectrum peak value obtained from a fixed pattern of the received optical signal that is received by the optical to electric converter,
    a sensitivity of detecting a sampling phase shift when synchronizing a sampling phase of the digital signal,
    an amount of the sampling phase shift when synchronizing the sampling phase of the digital signal,
    a peak value of a constellation distribution of the shaped signal,
    a peak width of the constellation distribution of the shaped signal, and
    a signal quality value of the constellation of the shaped signal,
  wherein the threshold has a first value for judging deterioration of the optical signal and a second value for judging loss of the optical signal, the second value being different from the first value.

2. The optical receiver according to claim 1, wherein the judging circuit judges, based on a plurality of pieces of the information extracted by the information extract circuit, whether the optical signal is lost or deteriorated.

3. An optical transmission system comprising:
an optical transmitter that transmits an optical signal;
a transmission path for the optical signal transmitted by the optical transmitter; and
an optical receiver including:
an optical to electric converter that converts a received optical signal into an analog electric signal;
an analog to digital converter that converts the analog electric signal obtained by the optical to electric converter into a digital signal;
a digital signal processor that performs wave shaping on the digital signal to produce a shaped signal;
an information extract circuit that extracts information related to loss or deterioration of the optical signal from a signal propagating from the analog to digital converter to the digital signal processor or a signal in the digital signal processor; and
a judging circuit that judges, based on the information extracted by the information extract circuit, whether the optical signal is lost or deteriorated by comparing the information with a threshold, the information including at least one of:
a number of times that an amplitude of the digital signal exceeds a threshold within a predetermined period,
a light spectrum peak value obtained from a fixed pattern of the received optical signal that is received by the optical to electric converter,
a sensitivity of detecting a sampling phase shift when synchronizing a sampling phase of the digital signal,
an amount of the sampling phase shift when synchronizing the sampling phase of the digital signal,
a peak value of a constellation distribution of the shaped signal,
a peak width of the constellation distribution of the shaped signal, and
a signal quality value of the constellation of the shaped signal,
wherein the threshold has a first value for judging deterioration of the optical signal and a second value for judging loss of the optical signal, the second value being different from the first value.

4. The optical transmission system according to claim 3, further comprising a notifying unit that warns based on the result of the judgment made by the judging circuit.

5. The optical transmission system according to claim 4, wherein:
the transmission path comprises a plurality of routes; and
the optical transmission system further comprises a switch that switches, based on the result of the judgment made by the judging circuit, the plurality of routes.

6. A method of receiving an optical signal in an optical receiver including an optical to electric converter that converts a received optical signal into an analog electric signal, an analog to digital converter that converts the analog electric signal obtained by the optical to electric converter into a digital signal, and a digital signal processor that performs wave shaping on the digital signal to produce a shaped signal, the method comprising:
extracting information related to loss or deterioration of the optical signal from a signal propagating from the analog to digital converter to the digital signal processor or a signal in the digital signal processor; and
judging, based on the information extracted by the extracting, whether the optical signal is lost or deteriorated by comparing the information with a threshold, the information including at least one of
a number of times that an amplitude of the digital signal exceeds a threshold within a predetermined period,
a light spectrum peak value obtained from a fixed pattern of the received optical signal that is received by the optical to electric converter,
a sensitivity of detecting a sampling phase shift when synchronizing a sampling phase of the digital signal,
an amount of the sampling phase shift when synchronizing the sampling phase of the digital signal,
a peak value of a constellation distribution of the shaped signal,
a peak width of the constellation distribution of the shaped signal, and
a signal quality value of the constellation of the shaped signal,
wherein the threshold has a first value for judging deterioration of the optical signal and a second value for judging loss of the optical signal, the second value being different from the first value.

7. The optical receiver according to claim 1, wherein the judging circuit judges that the optical signal is lost or deteriorated when the amount of the sampling phase shift included in the information exceeds the threshold, and the second value is smaller than the first value.

8. The optical receiver according to claim 1, wherein the judging circuit judges that the optical signal is lost or deteriorated when a number of times, that the amplitude of the digital signal exceeds the threshold within a predetermined period, included in the information is lower than the threshold, and the second value is larger than the first value.

9. The optical receiver according to claim 1, wherein the judging circuit judges that the optical signal is lost or deteriorated when the light spectrum peak value included in the information is lower than the threshold, and the second value is larger than the first value.

10. The optical receiver according to claim 1, wherein the judging circuit judges that the optical signal is lost or deteriorated when the sensitivity of detecting the sampling phase shift included in the information is lower than the threshold, and the second value is larger than the first value.

11. The optical receiver according to claim 1, wherein the judging circuit judges that the optical signal is lost or deteriorated when the peak value of the constellation distribution included in the information is lower than the threshold, and the second value is larger than the first value.

12. The optical receiver according to claim 1, wherein the judging circuit judges that the optical signal is lost or deteriorated when the peak width of the constellation distribution included in the information exceeds the threshold, and the second value is smaller than the first value.

13. The optical receiver according to claim 1, wherein the judging circuit judges that the optical signal is lost or deteriorated when the signal quality value of the constellation included in the information is lower than the threshold, and the second value is larger than the first value.

* * * * *